United States Patent [19]
Courbat et al.

[11] 3,888,990

[45] June 10, 1975

[54] MEDICAMENTS CONTAINING EPICATECHIN-2-SULFONIC ACIDS AND SALTS THEREOF

[75] Inventors: Pierre Courbat; André Valenza, both of Nyon, Switzerland

[73] Assignee: ZYMA S.A., Nyon, Vaud, Switzerland

[22] Filed: Sept. 6, 1973

[21] Appl. No.: 394,627

Related U.S. Application Data

[63] Continuation-in-part of Ser. No. 117,718, Feb. 22, 1971, abandoned.

[30] Foreign Application Priority Data

Mar. 13, 1970 Switzerland.......................... 3809/70

[52] U.S. Cl. .............................................. 424/283
[51] Int. Cl............................................ A61k 27/00

[58] Field of Search..................................... 424/283

[56] References Cited
UNITED STATES PATENTS

3,270,003    8/1966    Van Blaricom et al...... 260/345.2 X

*Primary Examiner*—Albert T. Meyers
*Assistant Examiner*—Daren M. Stephens
*Attorney, Agent, or Firm*—Stevens, Davis, Miller & Mosher

[57] ABSTRACT

A medicament against vascular diseases and conjunctive tissue disorders, comprising a pharmaceutically effective amount of (+)-epicatechin-2-sulfonic acid, or (−)-epicatechin-2-sulfonic acid, or (±)-eipcatechin-2-sulfonic acid, or a pharmaceutically acceptable salt thereof, and a pharmaceutically acceptable carrier.

2 Claims, No Drawings

MEDICAMENTS CONTAINING EPICATECHIN-2-SULFONIC ACIDS AND SALTS THEREOF

This application is a continuation-in-part of our co-pending application Ser. No. 117,718 filed Feb. 22, 1971 and now abandoned.

The catechins and epicatechins having the general formula

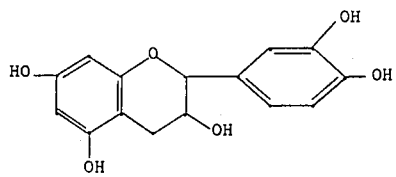

are 5,7,3',4'-tetra-hydroxy-flavan-3-ols. They have been described, e.g., by E. Hardegger, H. Gempeler and A. Züst, Helv. Chim. Acta 40, 1819 (1957); A. Züst, F. Lohse and E. Hardegger, Helv. Chim. Acta 43, 1274 (1960). These compounds have the drawback of a therapeutical application which is both limited and difficult, which may doubtless be attributed to their poor solubilities in water at room temperature.

The catechins and epicatechins are difficult to dissolve in cold water, but are easily dissolved in warm water. It is recognized that these substances undergo an auto-condensation when heated in aqueous solution or when subjected to mineral acids, and they are changed into amorphous tannins which, in the early stages, are substances which are colourless and water-soluble, and in the last stages, insoluble coloured substances known as "red tannins" and composed of polymers.

Among the catechin and epicatechin derivatives known at present, the acetyl, methyl, bromo, bromoacetyl, bromo-methyl, acetyl-methyl, methyl-bromoacetyl, methyl-p-toluo-sulfonic, benzoyl, methyl-mesyl, methyl-benzyl, methyl-propionyl and methylchloroacetyl derivatives must be mentioned.

These derivatives possess a common property: that of being practically insoluble in water at room temperature. Further, none of these substances has ever been used therapeutically.

The object of this invention is to provide new epicatechin derivatives which have the advantage of being very soluble in water at room temperature, of being practically free from toxicity and of possessing a pharmacological and clinical action which is distinctly better than that of the catechins and epicatechins.

The new derivatives, the epicatechin-2-sulfonic acids and their salts have the following structure:

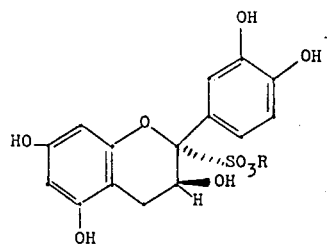

(+)-epicatechin-2-sulfonic acid (R = H)

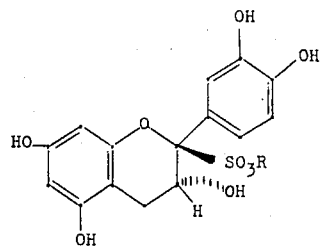

(-)-epicatechin-2-sulfonic acid (R = H)

In these formulas R represents hydrogen and preferably an alkali ion, a magnesium, calcium or iron equivalent, or organic ammonium. The alkali ion may be sodium, potassium or ammonium.

The method for preparing these new acids and their salts is characterized in that 1 mole of catechin or epicatechin is reacted with at least 1 mole of bisulfite in an at least partially, aqueous medium, and in that the sulfonic salt thus obtained from the reaction residue is isolated by means of a polar organic solvent. The sulfonic acid may be released, for instance by cation-exchangers.

The reaction with bisulfite may be carried out, at least at the beginning, protected from oxygen. It has been shown that during the reaction the catechins are gradually transformed into epicatechins and that the latter are then sulfonated. Using the same reaction conditions, but starting from epicatechins, the reaction yields the same derivatives.

In order to prepare salts from the free acid, the acid may be reacted directly with a base in stoichiometric proportion, in water or a suitable solvent. Should the salts not precipitate, they may be separated by evaporating the reaction product or by spraying the solution.

EXAMPLE 1

Preparation of sodium (+)-epicatechin-2-sulfonate.

290 g (1 gram-mole) of (+)-catechin are suspended in 1,000 ml of demineralized water under purified nitrogen. The mixture is heated to 55°C, with stirring, to completely dissolve the (+)-catechin. To this solution are added 182 g (1.75 gram-mole) of sodium bisulfite which dissolves completely. The reaction is then heated to gentle reflux and the latter is maintained for approximately 6 hours. At the beginning of the reflux a strong release of $SO_2$ occurs, the nitrogen stream may then be stopped. When the reaction is completed, the solution is cooled to room temperature, it is vacuum-distilled and the residue is dried, sieved and weighed.

The residue is suspended in 3.7 liters of a methanol-acetone mixture (22:78 v/v), the suspension is refluxed for 1 hour, it is then cooled and kept at −10°C overnight. The insoluble mineral salts are collected by filtration of a Buchner funnel and are washed twice with 0.750 liters of the solvent extraction mixture.

The organic extracts are combined, are evaporated at ordinary pressure, and the residue is vacuum-dried. The dry product is dissolved in demineralized water in order to obtain an approximately 15% liquor which is filtered before being vacuum-distilled. The residue is then dried and sieved; it consists of sodium (+)-epicatechin-2-sulfonate.

Yield: 354 g – 377 g (i.e., 90 to 96%).

Various laboratory tests allowed all the parameters of this reaction to be analysed. The results are as follows:

Reagent proportions

The optimum bisulfite proportion for (+)-catechin is between 1.5 and 2.0 gram-mole of sodium bisulfite for 1gram-mole of (+)-catechin. With a proportion lower than 1.5 gram-mole of sodium bisulfite the reaction yields a mixture which still contains (+)-catechin and unreacted (+)-epicatechin. With a proportion above 2.0 gram-mole of sodium bisulfite, the sodium (+)-epicatechin-2-sulfonate yields unindentified and undesirable by-products.

Method of mixing the reagents

It is advisable to introduce the reagents in the following order: demineralized water, then the (+)-catechin, and finally sodium bisulfite. Indeed, should the water be added to the (+)-catechin, there is a risk of this substance being difficult to dissolve, and for a compact mass to be formed in the bottom of the reaction flask, and this mass might be thermally decomposed on heating. Further, the sodium bisulfite is usually introduced directly in crystalline form, it can also be introduced as an aqueouos solution.

Purity of the reagents

It is desirable to work with (+)-catechin which is as pure as possible. Sometimes the (+)-catechin contains organic impurities of vegetable origin which it is better to remove by successive crystallizations in water in the presence of charcoal.

Concentration of the reaction medium

The solubility of (+)-catechin limits the concentration of the reaction medium, however, it is possible to work with concentrations slightly over 30% of (+)-catechin, which is desirable for industrial operations. With less concentrated solutions the reaction is still possible.

Reaction time

During the first half hour of reflux the (+)-epicatechin-2-sulfonic acid does not appear, however, epimerisation of the (+)-catechin takes place partly. The reaction time is a function of the reaction solution, it is slower for dilute solutions, and it is faster for concentrated solutions. One has observed that the reaction is about five times faster when a 30% solution is used instead of a 3% solution.

Reaction temperature

Below 55°C the reaction practically does not take place, from 55°C to 85°C the reaction is slow, and above 85°C the reaction develops favorably. The gentle reflux temperature is very favorable to the development of the reaction. Nevertheless, tests carried out at 120°C under pressure have yielded excellent results.

EXAMPLE 2

Preparation of sodium (−)-epicatechin-2 -sulfonate.

With the conditions described in Example 1, but replacing (+)-catechin by either (−)-catechin or (−)-epicatechin, the reaction leads to sodium (−)-epicatechin-2-sulfonate, with a 90 to 96% yield.

EXAMPLE 3

Preparation of (+)-epicatechin-2-sulfonic acid.

A 10% aqueous solution of sodium (+)-epicatechin-2-sulfonate is passed through a cation exchange resin such as Dowex 50W X2. The liquor collected has a pH value of 1.7 and is in fact an aqueous solution of (+)-epicatechin-2-sulfonic acid. This solution has an UV absorption at 279 nm.

This acid is very soluble in water from which it cannot be separated, for even by vacuum-concentrating the aqueous solution, a partial decomposition of the substance is observed.

EXAMPLE 4

Preparation of potassium (+)-epicatechin-2-sulfonate.

The aqueous solution of (+)-epicatechin-2-sulfonic acid prepared according to Example 3 is neutralized with an aqueous solution of potassium hydroxide. The liquor thus obtained is then vacuum-distilled at 40°–50°C. The residue is dried at 100°–120°C, and then sieved. The yield of potassium (+)-epicatechin-2-sulfonate is quantitative.

EXAMPLE 5

Preparation of ammonium (+)-epicatechin-2-sulfonate.

The aqueous solution of (+)-epicatechin-2-sulfonic acid obtained according to Example 3 is neutralized with an ammonium hydroxide solution. The liquor is then vacuum-evaporated and the residue is dried and sieved and ammonium (+)-epicatechin-2-sulfonate is obtained in a quantitative yield.

EXAMPLE 6

Preparation of magnesium (+)-epicatechin-2 -sulfonate.

To the solution of (+)-epicatechin-2-sulfonic acid prepared according to Example 3 the stoichiometric amount of basic magnesium carbonate in powder form is added. The mixture is stirred until the magnesium base is completely dissolved. It is to be noted that $CO_2$ is evolved from the beginning of the reaction, while the pH of the solution changes from 1.7 to 5.2. The pH slowly increases to 6.5. At this stage it stays stable and the solution is distilled, the dried residue is simply the desired magnesium salt in quantitative yield.

The new acids and their salts are particularly effective against vascular diseases and conjunctive tissue disorders.

The following scientific reports contains results obtained with these new compounds both in vitro and in vivo:

R. Horn et al.
Action de quelques catéchines sur l'activité d'un enzyme (la cytochrome-oxydase) de la chaîne respiratoire. Experientia 26, 1081 (1970)

P. Niebes et L. Laszt
Influence in vitro d'une série de flavonoïdes sur des enzymes du métabolisme des mucopolysaccharides de veines saphènes humaines et bovines. Angiologica 8, 297 (1971)

D. Tesi et W. G. Forssmann
Permeability studies with the interstitial tissue of the rat mesentery. II. Effect of a flavonoid on the permeability of interstitial tissue. Pflügers Archiv 322, 188 (1971).

J. Remien et W. Felix
Zur Wirkung des Flavonoids Natrium-(+)-Epikatechin-2-Sulfonat auf die Gerfässe und den Flüssigkeitsaustausch in den Kapillaren der Katzenextremität. Deutsch. med. J. 23, 495 (1972).

H. Schlebusch et D. Kern

Stabilization of collagen by polyphenols. Symposia Angiologica Santoriana 4th int. Symp., Fribourg 1972 Angiologica 9 248–256 (116–124) (1972)

G. Cetta et al.

Effet des flavonoïdes sur le collagène dans le lathyrisme. Symposia Angiologica Santoriana. 4th int. Symp. FribourgNyon 1972. Angiologica 9, 235–247 (103–115) (1972).

S. Srinivasan et al.

Effects of some flavonoids on the surface charge characteristics of the vascular system and their antithrombogenic characteristics. 6th Europ. Conf. Microcirculation, Aalborg 1970, pp. 394–398 (Karger, Basel 1971).

The duration of the treatment varies, according to the disorders to be treated, from a few days to several months, according to the kind of disorder, and its seriousness. The total dosage per day is about 1 to 2 g per day.

The pharmaceutical compositions may contain any pharmaceutically acceptable diluent, excipient or other active agents. These compositions may be formulated in various forms, in order to be admnistered orally, rectally or parenterally. They may be prepared in the following forms which are illustrative and not limitating examples:

a. for oral administration: tablets containing 100 mg, 250 mg, 300 mg and 500 mg of epicatechin-2-sulfonic acid and salts;

b. for rectal administration: suppositories containing 50 mg, 200 mg and 300 mg of epicatechin-2-sulfonic acid and salts;

c. for parenteral administration: a 2, 5 and 10% solution of epicatechin-2-sulfonic acid and salts thereof.

During short and long duration treatments with the doses indicated, no secondary effect which might be attributed to the novel acids and their salts was observed.

It is to be noted that the toxicity was systematically studied beforehand on rats, mice, rabbits and beagles. Apart for some minor gastric disturbances at the beginning of the treatment, no toxic or teratogenesis effect was found.

| 100 mg tablet: | epicatechin-2-sulfonic acid | 0.100 |
| --- | --- | --- |
| | wheat starch | 0.010 |
| | "Aerosil" | 0.004 |
| | microcr. cellulose | 0.040 |
| | lactose | 0.041 |
| | talc | 0.005 |
| | | 0.200 g φ 9 mm |
| 250 mg tablet: | epicatechin-2-sulfonic acid sodium salt | 0.250 |
| | wheat starch | 0.025 |
| | "Aerosil" | 0.010 |
| | microcr. cellulose | 0.100 |
| | lactose | 0.105 |
| | talc | 0.010 |
| | | 0.500 g φ 10,5 mm |
| Injectable: | epicatechin-2-sulfonic acid ammonium salt | 0.050 g |
| | Carbowax 300 | 0.150 g |
| | redistilled water up to | 5 ml |
| 100 mg suppositories: | epicatechin-2-sulfonic acid sodium salt | 0.100 |
| | "Aerosil" comp. | 0.020 |
| | triglyceride up to | 2.000 g (approx.) |
| 250 mg suppositories: | epicatechin-2-sulfonic acid diethanolammonium salt | 0.250 |
| | "Aerosil" comp. | 0.030 |
| | triglyceride up to | 2.000 g (approx.) |

We claim:

1. A medicament against vascular disease and conjunctive tissue disorders, comprising a pharmaceutically effective amount of a compound selected from the group consisting of (+)-epicatechin-2-sulfonic acid, (−)-epicatechin-2-sulfonic acid, (+)-epicatechin-2-sulfonic acid and a pharmaceutically acceptable salt thereof, and a pharmaceutically acceptable carrier.

2. The medicament of claim 1, wherein said compound is the sodium salt of (+)-epicatechin-2-sulfonic acid.

* * * * *